United States Patent [19]

Sakamoto et al.

[11] Patent Number: 4,683,586

[45] Date of Patent: Jul. 28, 1987

[54] SCRAMBLING SYSTEM FOR AN AUDIO FREQUENCY SIGNAL

[75] Inventors: Akira Sakamoto; Takeshi Fukami, both of Tokyo; Takehiro Sugita, Chigasaki; Masakatsu Toyoshima, Tokyo, all of Japan

[73] Assignee: Sony Corporation, Tokyo, Japan

[21] Appl. No.: 566,899

[22] Filed: Dec. 29, 1983

[30] Foreign Application Priority Data

Jan. 11, 1983 [JP] Japan .................................. 58-2481

[51] Int. Cl.[4] ............................................... H04L 9/00

[52] U.S. Cl. ........................................ 380/48; 380/36; 375/112

[58] Field of Search .................... 370/109; 381/34, 32; 178/22.17, 22.04; 375/116, 112

[56] References Cited

U.S. PATENT DOCUMENTS

| | | | |
|---|---|---|---|
| 3,213,268 | 10/1965 | Ellersick, Jr. | 381/34 |
| 3,633,172 | 1/1972 | Eggimann | 370/109 |
| 3,636,524 | 1/1972 | Holland | 370/109 |
| 4,302,628 | 11/1981 | Akrich et al. | 178/22.04 |
| 4,344,180 | 8/1982 | Cummiskey | 375/116 |
| 4,383,322 | 5/1983 | Halpern et al. | 375/112 |
| 4,392,021 | 7/1983 | Slate | 179/1.5 R |
| 4,410,980 | 10/1983 | Takasaki et al. | 370/109 |
| 4,434,323 | 2/1984 | Levine et al. | 178/22.17 |

*Primary Examiner*—Salvatore Cangialosi
*Assistant Examiner*—Aaron J. Lewis
*Attorney, Agent, or Firm*—Lewis H. Eslinger; Alvin Sinderbrand

[57] ABSTRACT

A scrambling system for an audio frequency signal is disclosed which employs a timebase-compressing and/or expanding system to measure the compressed and/or expanded amount of a segment time length caused in a transmission recording and reproducing system. In the scrambling system of the present invention, a marker signal is inserted into a portion between the adjoining segments and transmitted from an encoder side to a decoder side, while at the decoder side, this marker signal is detected, the synchronization is achieved by this marker signal along the compression and expansion of the segment length and the respective segments are rearranged to the original correct order. Thus, the connected portion between the segments can be made smooth so that it is possible to obtain the scrambling system for an audio frequency signal having high accuracy and high reliability.

3 Claims, 9 Drawing Figures

SCRAMBLING SYSTEM FOR AN AUDIO FREQUENCY SIGNAL

BACKGROUND OF THE INVENTION

1. Field of the Invention

The present invention relates generally to a scrambling system for an audio frequency signal and more particularly is directed to a scrambling system for an audio frequency signal which is suitable for being used in a case wherein successive segments of audio frequency signal are rearranged in an and then transmitted.

2. Description of the Prior Art

As a method for scrambling an audio signal in, for example, a cable television broadcast system, there has been proposed a method wherein a block of an audio signal having a certain length is divided into segments and the rearrangement of these segments is carried out on a compressed timebase. In that case, there is a defect that due to a discontinuity of a waveform at the border between the rearranged segments, the succeeding waveform is partly distorted. To remove this defect, the same assignee of this application has previously proposed a timebase compressing and expanding method of a waveform (which is disclosed in Japanese patent application, No. 222299/1982).

In this previously proposed method, at a scrambling side, a waveform of an audio signal which is a little longer than one segment duration of time is timebase-compressed to one segment duration of time and then transmitted, while at an unscrambling side, a waveform of an audio signal corresponding to the net segment amount in the one segment duration of time is extracted and then timebase-expanded to the original one segment duration of time and the timebase-expanded segments are connected whereby to remove the defect caused by the discontinuity in the waveform. This previously proposed method is quite effective for the restricted analog transmission band region.

In such method, when a vertical synchronizing signal VD or the like in a television video signal is used as the synchronizing control signal, no problem occurs at all under the state that the audio signal and the video signal are synchronized with each other, namely, no time displacement exists therebetween or the time displacement is fixed.

However, in, for example, a transmission system, when the transmission routes or paths of the video signal and the audio signal are different from each other, a relative time displacement of the two signals sometimes occurs at the receiving end or side. Moreover, when the recording and/or reproducing is carried out by a VTR (video tape recorder), a video image is adjusted to be optimum. As a result, these signals are reproduced having the time displacement. Furthermore, a wow and flutter inherent in the VTR itself may sometimes cause the video signal and the audio signal to have a time displacement therebetween. When the synchronization is disordered in the transmission recording and reproducing system as described above, and the sequential order of the segments is rearranged to the original order, the connected portion between the segments is not formed correctly so that the audio signal is distorted at the connected portion or a noise is generated at the connected portion. As a result, there occurs a problem that the quality of the audio signal is deteriorated and so on.

OBJECTS AND SUMMARY OF THE INVENTION

Accordingly, it is an object of the present invention to provide an improved scrambling system for an audio frequency signal which can remove the defects inherent in the conventional scrambling system.

It is another object of the present invention to provide a scrambling system for an audio frequency signal in which a marker signal is inserted into a redundant time portion of each segment produced upon timebase-compressing, this marker signal is detected and the beginning and the end of the segment are detected by this marker signal, and then the adjoining segments of the audio signal are connected smoothly.

It is further object of the present invention to provide a scrambling system for an audio frequency signal which can provide a scrambling communication system for audio frequency signals having high accuracy and high reliability.

According to one aspect of the present invention, there is provided a scrambling system for an audio frequency signal in which an audio signal is divided into blocks, each block being formed of a plurality of segments, said plurality of segments are rearranged or encoded on a timebase at each block with a predetermined order and said encoded signal is rearranged or decoded on the timebase to the original order comprising:

- means for inserting a redundant portion into a portion between adjoining segments upon encoding;
- timebase-compressing means for timebase-compressing said segments in response to said redundant portion;
- means for inserting a marker signal into said redundant portion;
- means for detecting said marker signal upon decoding;
- means for establishing the synchronization of said segments by using said marker signal along the timebase-expansion and timebase-compression thereof;
- means for measuring a distance between adjoining marker signals; and
- means for rearranging said segments to the original order by using said measured distance as a segment time length.

The other objects, features and advantages of the present invention will become apparent from the following description taken in conjunction with the accompanying drawings through which the like references designate the same elements and parts.

DESCRIPTION OF THE PREFERRED EMBODIMENT

Now, an embodiment of a scrambling system for an audio frequency signal according to the present invention will hereinafter be described in detail with reference to the figures.

Figures 1A, 1B, 1C, 1D, 1E, 1F, 1G:
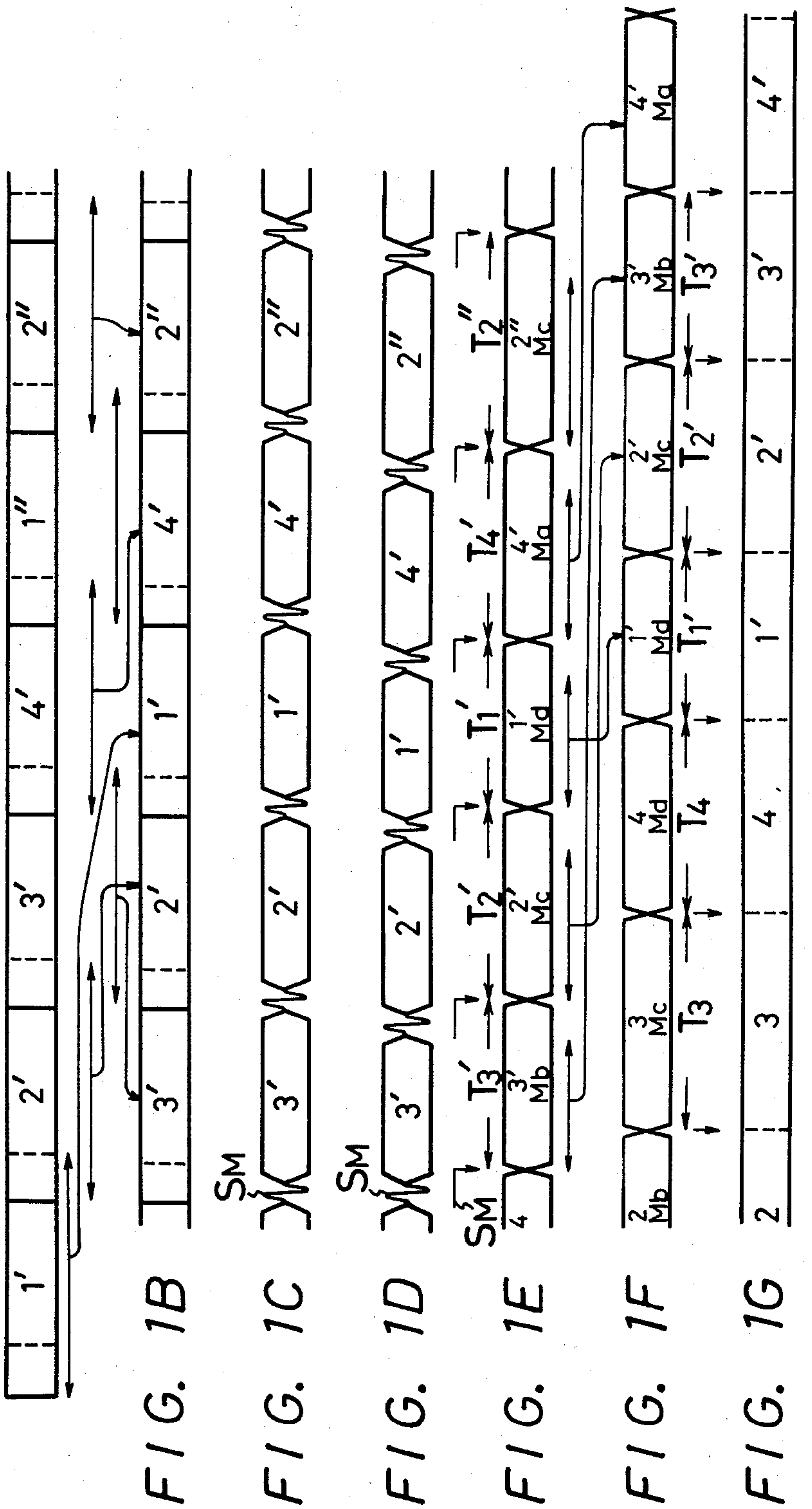
FIGS. 1A to 1G are respectively signal waveform diagrams useful for explaining the fundamental principle of the present invention.

The fundamental principle of the present invention will be described first with reference to FIGS. 1A to 1G. In this case, a description will be given of a scrambling system in which each block of the audio signal is divided into four segments and the sequential time order of these four segments is rearranged. First, at the encoder side, as shown in FIG. 1A, each block of the original audio signal is further divided into segments, and a waveform the length of which is a little longer than the segment length as shown by arrows in FIG. 1A is extracted from each segment and a portion of an adjoining segment, so that there are overlapping or redundant signal portions between adjoining segments. The extracted waveforms are each timebase-compressed to equal to the original segment length and rearranged in sequential order in accordance with a predetermined scrambling pattern as shown in FIG. 1B. Then, as shown in FIG. 1C, a marker signal $S_M$ is inserted into a redundant time portion at the beginning of each segment, which then is transmitted to a decoder side as a scrambled signal. When the scrambled signal transmitted from the encoder side passes through a transmission recording and/or reproducing system such as a VTR or and the like, the scrambled signal is apt to be frequently timebase-fluctuated therein and the timebase thereof is compressed and expanded as shown in FIG. 1D.

Therefore, at the decoder side, the marker signal $S_M$ is detected from the scrambled signal transmitted as shown in FIG. 1D. The detected marker signal is shown by an arrow ⌉↓ in FIG. 1E. Strictly speaking, with a constant time after the marker signal was detected, the detected marker signal is regarded as the true marker signal. Because, when the marker signal is generated, the waveform of the segment thereof must already rise up (in the normal mode).

The time length from this marker signal $S_M$ to a next marker signal $S_M$ represents the segment length which has been compressed or expanded during transmission. The signal shown in FIG. 1D is written in a memory section in synchronism with the marker signal as shown in FIG. 1E. By way of example, the signal is sequentially written in data memory Mb, Mc, Md and Ma of four segment amounts in such a manner that the segment 3'is written with the duration of time $T'_3$ from the beginning of the memory address Mb and the segment 2'is written with the duration of time $T'_2$ from the beginning of the memory address Mc, . . . . On the other hand, at the reading side, as shown in FIG. 1G, the signal is read out in such a manner that the respective segments are arranged in the correct original order (1, 2, 3, 4, 1', 2', . . . ) upon reading. More particularly, in accordance with the scramble pattern determined by the key code, the respective memory are read from the beginnings thereof with durations of time of $T'_1$, $T'_2$, $T'_3$, $T'_4$ . . . in the sequential order of Md, Mc, Mb, Ma, . . . .

The time relation between the writing and the reading is selected in such a manner that when the original audio signal as shown in FIG. 1A is rearranged in the sequential order as shown in FIG. 1B with the timebase being compressed to, for example, 4/5, the net (non-redundant) data occupies 4/5 of the segment time length shown in FIG. 1B. Accordingly, at the decoder side, in the process where the data is written in response to the clock signal with the sampling frequency $f_{AD}$ of an A/D (analog-to-digital) converter as shown in FIG. 1E, the net data occupies 4/5 of the time length $T'_3$ of, for example, the segment 3'. When this time length of 4/5 is restored to the original time length, it is sufficient that the net data is timebase-expanded to 5/4 and then is read out in response to the clock signal with the sampling frequency $f_{DA}$ of a D/A (digital-to analog) converter. Namely, $T'_3 \times 4/5 \times 5/4 = T'_3$ is established, which means that the data having the duration of time $T'_3$ is read out from the beginning of the memory address Mb on which the segment 3'is recorded. The reason why the switching time of the segment (memory) between the writing (see FIG. 1E) and the reading (see FIG. 1F) is fully displaced is to conserve memory area. For example, while a segment for example 4'is being read out from the memory address Md, another segment for example 1'can be written in the beginning of the same memory address Md. In that case, although $f_{AD} > f_{DA}$ is established, the switching time is sufficient displaced between the writing and the reading that new data is never written before a previous recorded data is read out. Moreover, while the segment 1'is being written in the memory address Md, the data is read out from the beginning of the memory address Md. In this case, since $f_{AD} > f_{DA}$, the read memory address is never ahead of the write memory address.

As described above, when each segment is synchronized while the timebase-compression and expansion state thereof are unchanged and rearranged in the original sequential order, the segments can be connected so as to have the smooth waveforms as shown in FIG. 1G. In this case, however, the wow and flutter per se caused in the recording and reproducing system still remain as they are.

Subsequently, the encoder and the decoder used in the present invention will be described.

Figure 2:
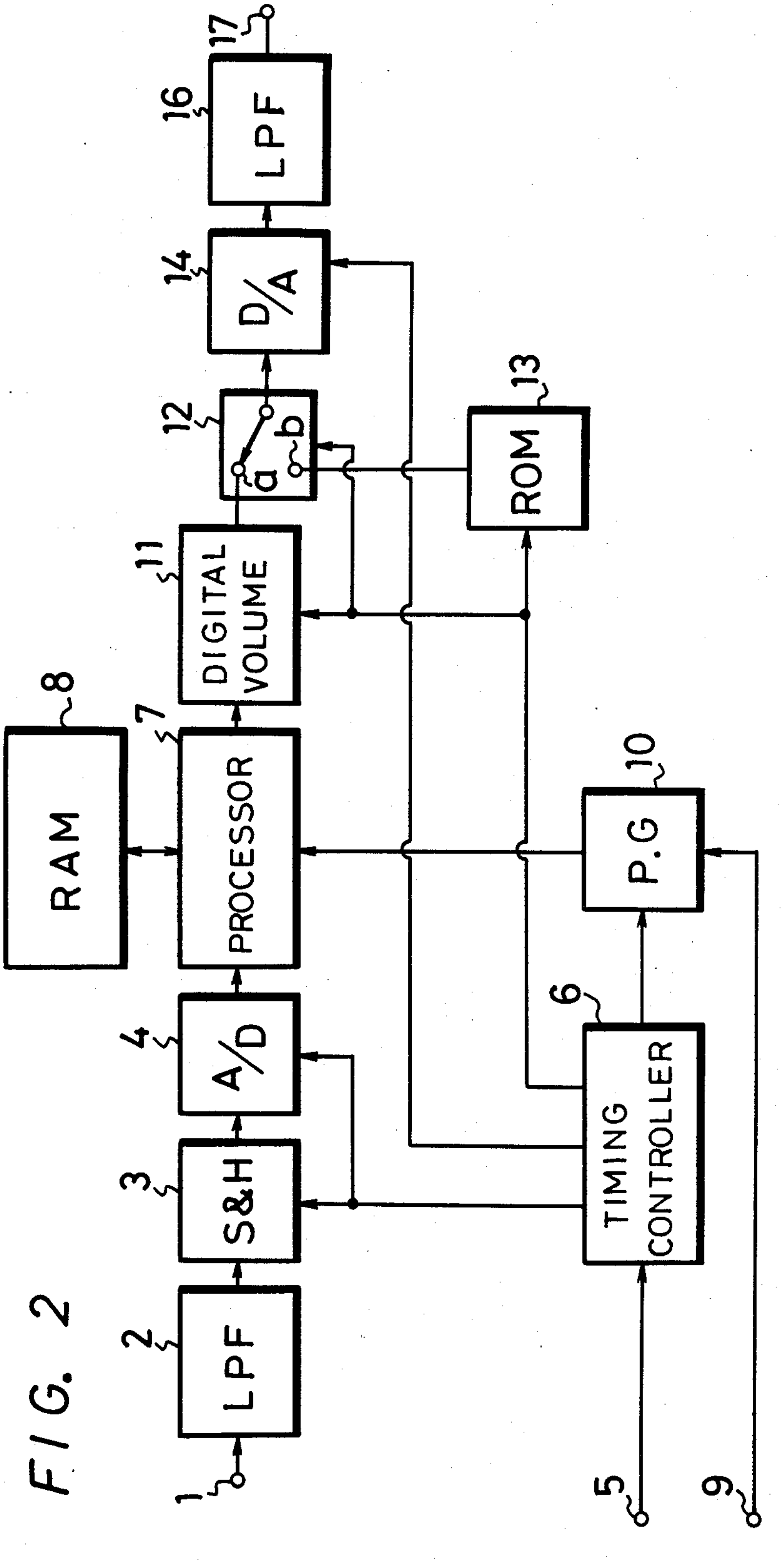
FIG. 2 is a schematic block diagram showing an example of an encoder used in an embodiment of a scrambling system for audio frequency signals according to the present invention.

FIG. 2 is a schematic block diagram showing an example of the encoder used in the present invention. In FIG. 2, reference numeral 1 designates an input terminal and the audio signal applied to this input terminal 1 is supplied through a low-pass filter 2 to a sample and hold circuit 3 in which the audio signal is sampled and held and then supplied to an A/D converter 4. The sample and hold circuit 3 and A/D converter 4 are controlled by a timing controller 6 to which the synchronizing signal of a video signal is supplied through a terminal 5.

In the A/D converter 4, the audio signal is converted in the form of analog data to digital data. This digital data is supplied through a signal processor 7 to a RAM (random access memory) 8 thereby written therein. At the same time, the data is read out from the RAM 8. The signal processor 7 is supplied with a pattern information regarding the rearrangement order which was previously set in a segment pattern generator 10 in accordance with a key code from a terminal 9 under the control of the timing controller 6. Consequently, on the basis of this pattern information, the segment is rearranged as shown in FIG. 1B, and the timebase-compression can be carried out by changing the rate between the writing and the reading of the RAM 8. In association therewith, the sampling frequency $f_{AD}$ of the A/D converter 4 and the sampling frequency $f_{DA}$ of a D/A converter 14 are made different from each other. In this case, of course, $f_{AD} < f_{DA}$ is satisfied. The D/A converter 14 is controlled by the timing controller 6, too.

The signal processed as above and derived from the signal processor 7 is supplied through a digital volume 11 and a switching circuit 12 to the D/A converter 14.

During this signal transmission, by switching the switching circuit 12 which will be described later, a marker signal from a marker signal generator 13 which employs, for example, a ROM (read only memory) is inserted into the beginning of each segment described as above with reference to FIG. 1.

The insertion of the marker signal is carried out by switching the switching circuit 12 and the timing of the switching is carried out as follows. Immediately before switching the segment, the marker signal is generated from the marker signal generator 13. At that time, the movable contact of the switching circuit 12 is connected to its contact a. By the digital volume 11, the scrambled signal from the signal processor 7 is decreased in a predetermined time period (about 1m sec). And at the time when its sound volume is decreased to approximately zero, the movable contact of the switching circuit 12 is connected to its contact b by the control of the timing controller 6. Accordingly, the marker signal from the marker signal generator 13 is supplied through the contact b of the switching circuit 12 to the D/A converter 14. At that time, the RAM 8 is already changed to a new segment. Then, at the time when the marker signal is ended, the switching circuit 12 is again changed in position to the contact a. Subsequently, by the digital volume 11, the sound volume of the scrambled signal from the signal processor 7 is raised in the above time period of approximately 1 m sec so as to reach a predetermined maximum value. As described above, the switching operation between the scrambled signal and the marker signal can be carried out smoothly.

The signal from the switching circuit 12 is supplied to the D/A converter 14 thereby converted from digital data to analog data. The analog data from the D/A converter 14 is delivered through a low-pass filter 16 to an output terminal 17, which then is transmitted to the decoder side.

Figure 3:
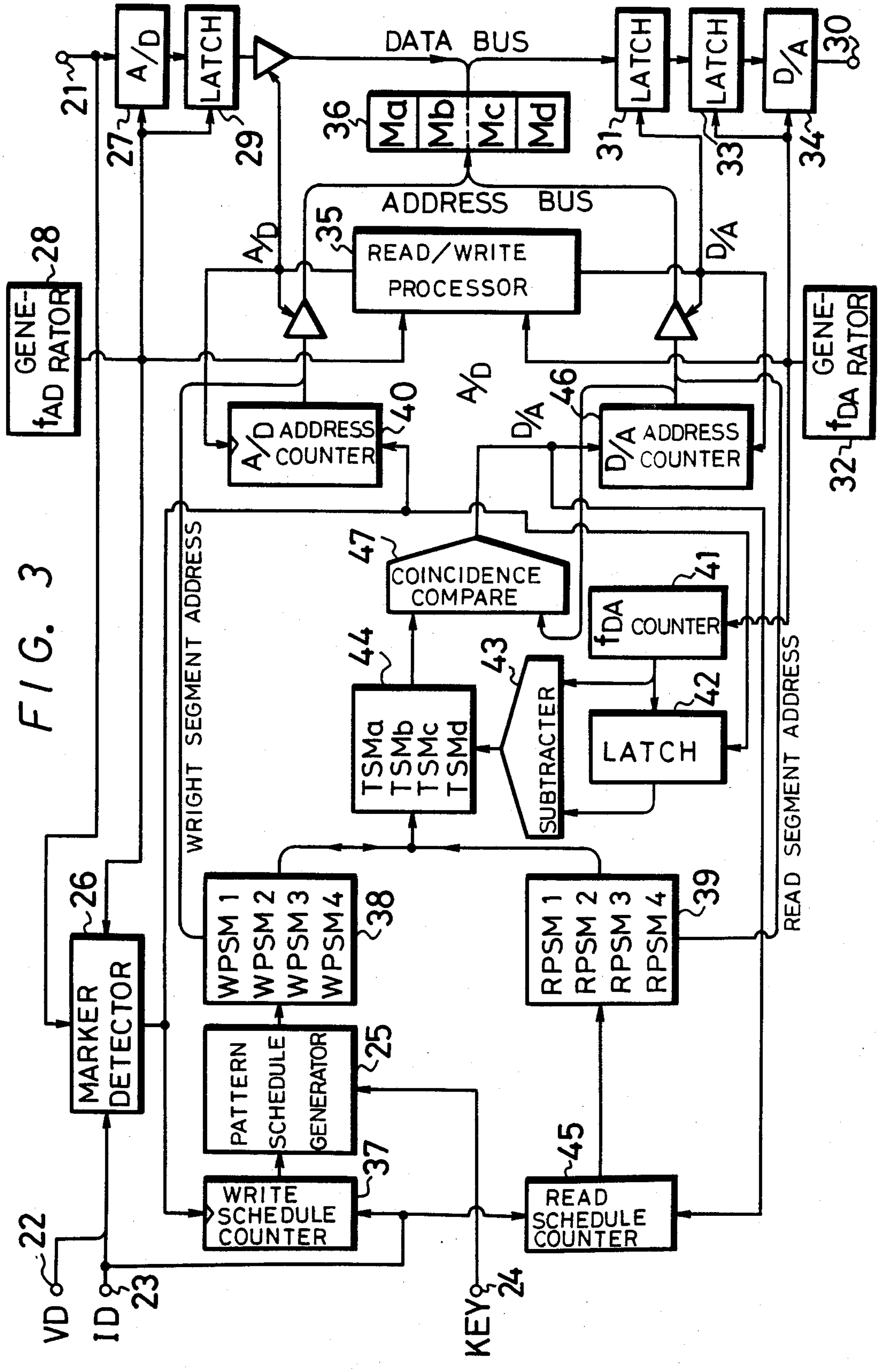
FIG. 3 is a schematic block diagram showing an example of a decoder used in the present invention.

FIG. 3 is a schematic block diagram showing an example of the decoder used in the present invention. In FIG. 3, reference numeral 21 designates an input terminal to which the scrambled audio signal from the encoder side is supplied. Reference numeral 22 designates an input terminal to which the synchronizing signal of a television video signal, for example, vertical synchronizing signal VD is supplied. Reference numeral 23 designates an input terminal to which an ID signal indicative of the beginning of a block is supplied and 24 an input terminal to which a key code signal KEY used to form a unscrambled data is supplied. The ID signal and the vertical synchronizing signal VD are applied from the television video signal. The ID signal is used to perform the initial synchronization of the pattern schedule, while the vertical synchronizing signal VD is used to form the timing relation of the whole of the circuitry.

The scrambled audio signal from the input terminal 21 is branched and one scrambled audio signal is supplied to a marker detector 26 in which the marker signal is detected. The other scrambled audio signal thus branched is supplied to an A/D converter 27 in which each time when the clock signal with the sampling frequency $f_{AD}$ is supplied thereto from a clock generator 28, it is converted in the form of analog signal to digital signal and then latched in a latch circuit 29.

Reference numeral 30 designates an output terminal to which the unscrambled audio signal is delivered. The unscrambled audio signal appearing at the output terminal 30 is provided in such a manner that the data from a latch circuit 31 is latched in a latch circuit 33 each time when the clock signal with the sampling frequency $f_{DA}$ from a clock generator 32 is supplied to the latch circuit 33 and then converted in a D/A converter 34.

Reference numeral 35 designates a read/write processor which is operated in such a manner that in response to the A/D processing request based on the clock signal from the clock generator 28 the data from the latch circuit 29 is written in a data RAM 36 at its predetermined address, while in response to the D/A processing request based on the clock signal from the clock generator 32, the data is read out from the data RAM 36 at its predetermined address and then latched in the latch circuit 31.

First, the A/D processing will be described. A write schedule counter 37 which is initialized by the ID signal from the input terminal 23 is incremented each time when the marker signal from the marker detector 26 is supplied thereto. In response to the count value of the write schedule counter 37, a pattern schedule generator 25 permits a write segment number generated by the key code from the input terminal 24 to be supplied to a write pattern schedule memory 38. The write pattern schedule memory 38 detects, based upon the output from a read pattern schedule memory 39, the memory address which is now being read and permits the same to be written in a corresponding memory address (WPSM1, WPSM2, WPSM3 and WPSM4) thereof. If, for example, the write segment is 1'and the segment 4 is now being accessed from the memory address Md of the data RAM 36, the memory address Md which is now being read is recorded at the memory address WPSM1 of the write pattern schedule memory 38. And, an A/D address counter 40 which is reset each time when the marker signal from the marker detector 26 is supplied thereto indicates the above memory address Md stored in the memory address WPSM1 together with an address now being written, which are then written in the memory area of the data RAM 36 indicated by the content of the write pattern schedule memory 38 by employing the address each time when A/D processing is requested of the read/write processor 35 by the clock signal from the clock generator 28. In addition, the A/D address counter 40 is incremented by the read/write processor 35.

On the other hand, the content of an $f_{DA}$ counter 41 which is self-running in response to the clock signal from the clock generator 32 is latched in a latch circuit 42 each time when the marker signal from the marker detector 26 is supplied to the latch circuit 42. When the marker signal from the marker detector 26 is supplied to the latch circuit 42 next time, a difference value between the count value of the $f_{DA}$ counter 41 and the content of the latch circuit 42 is calculated by a subtracter 43 and then recorded on a time schedule memory 44 and the count value of the counter 41 is latched in the latch circuit 42. For example, in the memory address TSMd of the time schedule memory 44 is recorded the time length T1'of the segment 1'as the clock number of the sampling frequency $f_{DA}$.

The operation of the D/A processing side will be described. A read schedule counter 45 which is initialized by the ID signal from the terminal 23 is used to supply the correct sequential order of 1, 2, 3, 4, 1, 2, 3, 4, . . . to the read pattern schedule memory 39. In this case, the read schedule counter 45 is operated in such a manner that when, for example, the segment 1 is presented, the memories stored in the write pattern schedule memory 38 are all recorded on the read pattern schedule memory 39. A read address is formed together of the read segment address now being read out from the read pattern schedule memory 39 and the content of a D/A address counter 46. Each time when the D/A processing is required for the read/write processor 35 by the clock signal from the clock generator 32, the data at that read address is read out from the address of the data RAM 36 and then latched in the latch circuit 31.

Moreover, the time schedule memory 44 is supplied with information indicative of the memory now being read from the read pattern schedule memory 39 and delivers a read time for the memory (namely, equal to the write time which is expressed by the clock number of the sampling frequency $f_{DA}$) to a coincidence comparator 47. Meanwhile, the count value of the D/A address counter 46 which is counted up at each D/A processing is also supplied to the coincidence comparator 47. If both of them are coincident with each other, the segment is read by the read time so that the coincidence comparator 47 generates the coincidence signal by which the D/A address counter 46 is reset and the read schedule counter 45 is incremented so as to indicate the succeeding sequential order.

As described above, the time T from one marker signal to next succeeding marker signal is recorded in the time schedule memory 44 as the clock count of the sampling frequency $f_{DA}$ from the clock generator 32. And, when that memory is read out, it is read for only the above time T and thereby the time displacement is compensated for, thus the waveforms being connected smoothly.

While in the above embodiment the marker signal is utilized as the synchronizing signal of each segment, the marker signal is not limited to the above use but can be used as, for example, a code signal and so on. In this case, if the marker signal within the redundant time portion for timebase-compression and -expansion is formed of another marker signal, the present segment number can be expressed thereby or such marker signal can be used instead of the ID signal of the initial set.

As set forth above, according to the present invention, in the timebase-scrambling system as one of the scrambling system for audio frequency signals, the marker signal is inserted into the redundant time portion of the scrambled audio signal, this marker signal is detected, the segment time length is measured by this marker signal and upon rearranging the segments and delivering the same, such time is used as the segment time. Thus, the connected portion between the waveforms can be made smooth. Therefore, it is possible to remove the distortion of the audio signal due to the discontinuity of the connected portion between the waveforms caused by the timebase-compression and timebase-expansion in the conventional transmission recording and reproducing system. Also, it is avoided that the quality of the audio signal is deteriorated by the noise which is generated by the distortion of the audio signal, thus the scrambling communication for audio frequency signals of high accuracy and high reliability becomes possible.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. Apparatus for scrambling and unscrambling an audio frequency analog signal which is digitized and divided into blocks, each block consisting of a plurality of adjoining multiple-bit segments arranged in an original order; said apparatus comprising:

encoding means for providing at an end of each of said segments a redundant signal portion from an adjacent end of one of said adjoining segments, thereby to form enlarged segments, rearranging and uniformly timebase-compressing by a selected amount said enlarged segments to form rearranged segments of the same duration as the original segments, and inserting a marker signal in place of each of said redundant signal portions to form an encoded signal on a predetermined time base for transmission to a decoding means, during which transmission the rearranged segments of said encoded signal may be randomly timebase-compressed or timebase-expanded relative to said predetermined time base; and said decoding means receiving said encoded signal for detecting successive ones of said marker signals in said received encoded signal, for measuring the respective separations between successive ones of said marker signals as detected, and for uniformly timebase-expanding said segments by the reciprocal of said selected amount used in said encoding means for said uniformly timebase-compressing and restoring the segments to said original order of said segments prior to the encoding thereof, said segments, as restored to the original order by said decoding means, each having a respective length proportional to the respective one of said separations measured between the preceding and succeeding marker signals in said decoding means, said decoding means comprising first memory means having a plurality of addresses for storing data representing respective segments of the received encoded signal corresponding to one of said blocks;

second memory means for storing data representing the addresses in said first memory means at which said segments of said one of said blocks are stored;

third memory means for storing data representing a duration of time for each of said segments stored in said first memory means; and means for reading out from said first memory means the data stored at said addresses in an order determined by data from said second memory means and during a time determined by data from said third memory means.

2. Apparatus for scrambling and unscrambling an audio frequency analog signal which is digitized and divided into blocks, each block consisting of a plurality of adjoining multiple-bit segments arranged in an original order; said apparatus comprising:

encoding means for providing at an end of each of said segments a redundant signal portion from an adjacent end of one of said adjoining segments, thereby to form enlarged segments, rearranging and uniformly time-base-compressing by a selected amount said enlarged segments to form rearranged segments of the same duration as the original segments, and inserting a marker signal in place of each of said redundant signal portions to form an encoded signal on a predetermined time base for transmission to a decoding means, during which transmission the rearranged segments of said encoded signal may be randomly time-base-compressed or timebase-expanded relative to said predetermined time base; said encoding means comprising generator means for generating said marker signals;

gain control means for adjusting the gain of said audio frequency signal;

switch means selectively connectable to one of said generator means and said gain control means for transmitting one of said marker signals or said audio signal to said decoding means; and timing controller means for periodically actuating said generator means, said gain control means and said switch means so that said gain control means reduces the gain of said audio frequency signal during each said redundant signal portion and said switch means is connected at that time to said generator means for transmitting one of said marker signals to said decoding means and, after each said redundant signal portion, said switch means is connected to said gain control means and said gain control means then increases the gain of said audio frequency signal; and said decoding means receiving said encoded signal for detecting successive ones of said marker signals in said received encoded signal, for measuring the respective separations between successive ones of said marker signals as detected, and for uniformly timebase-expanding said segments by the reciprocal of said selected amount used in said encoding means for said uniformly timebase-compressing and restoring the segments to said original order of said segments prior to encoding thereof, said segments, as restored to the original order by said decoding means, each having a respective length proportional to the respective one of said separations measured between the preceding and succeeding marker signals in said decoding means.

3. An apparatus for transmitting in scrambled form an audio signal that has associated with it a corresponding video signal, in which the audio signal is divided into blocks with each block being formed of a plurality of adjoining segments arranged in an original order, said apparatus comprising:

an encoder including means for inserting at an end of each of said segments a signal portion from an adjacent end of one of said adjoining segments, means for uniformly timebase-compressing said segments including said adjacent signal portions by a selected amount and for rearranging the order of said timebase-compressed segments relative to said original order, means for inserting a marker signal into each of said segments in place of said signal portion from said adjacent end of an adjoining segment to form an encoded signal of rearranged segments on a predetermined time base;

a decoder; and means for transmitting the encoded rearranged signal to said decoder during which transmission said rearranged segments of said encoded signal may become randomly timebase-varied relative to said predetermined time base; and said decoder including means for detecting said marker signals in said encoded signal received from the transmitting means, means for establishing synchronization of said segments relative to said corresponding video signal using said marker signals present in said timebase-varied segments, means for measuring respective lengths between successive detected marker signals, means for restoring said segments to said original order with the lengths of the segments, as restored to said original order, being proportional to the respective measured lengths between successive detected marker signals, and means for uniformly timebase-expanding said segments in said encoded received signal by the reciprocal of said selected amount used in said encoder for said uniformly timebase-compressing.

* * * * *